Dec. 8, 1931.   C. E. STOCKDALE   1,835,914
MACHINE FOR MAKING TILES
Filed Feb. 25, 1930   10 Sheets-Sheet 4
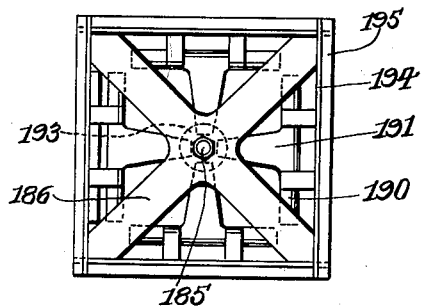
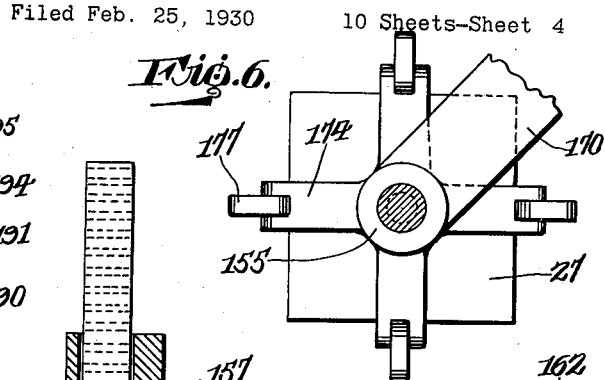
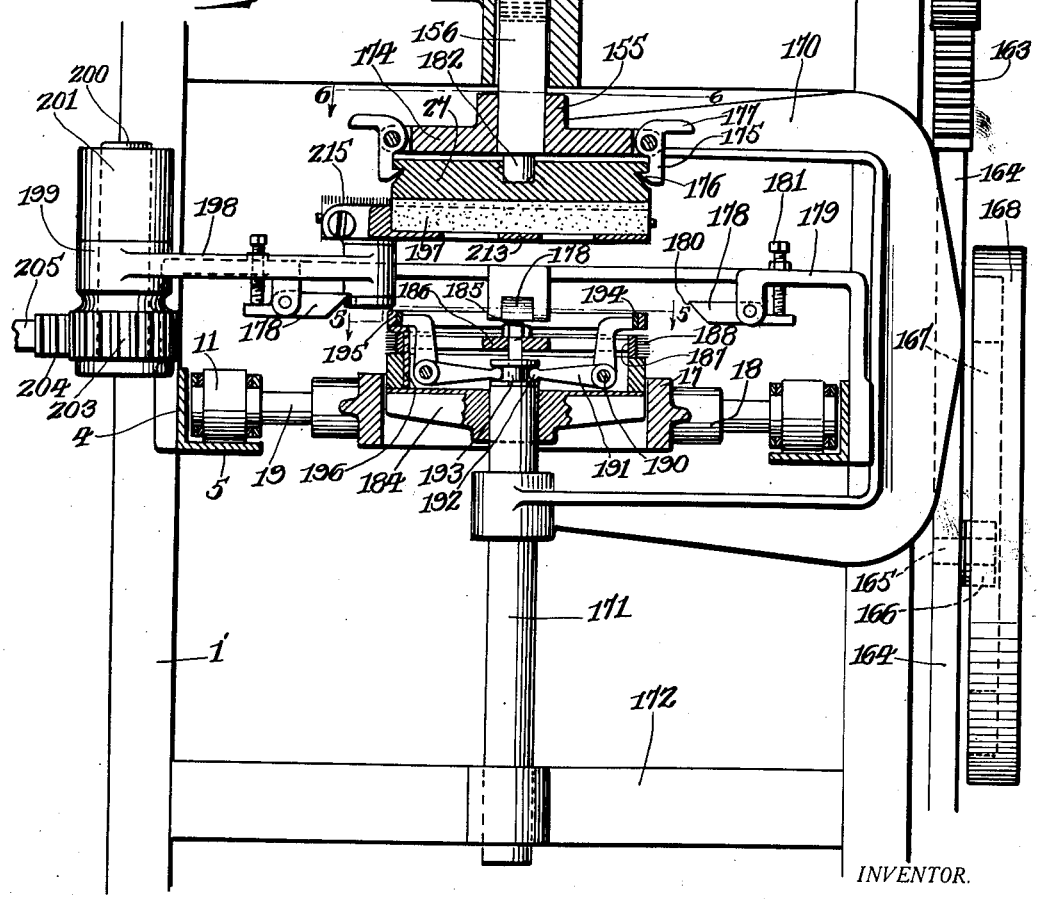
INVENTOR.
Charles E. Stockdale
BY
Geo. P. Kimmel
ATTORNEY.

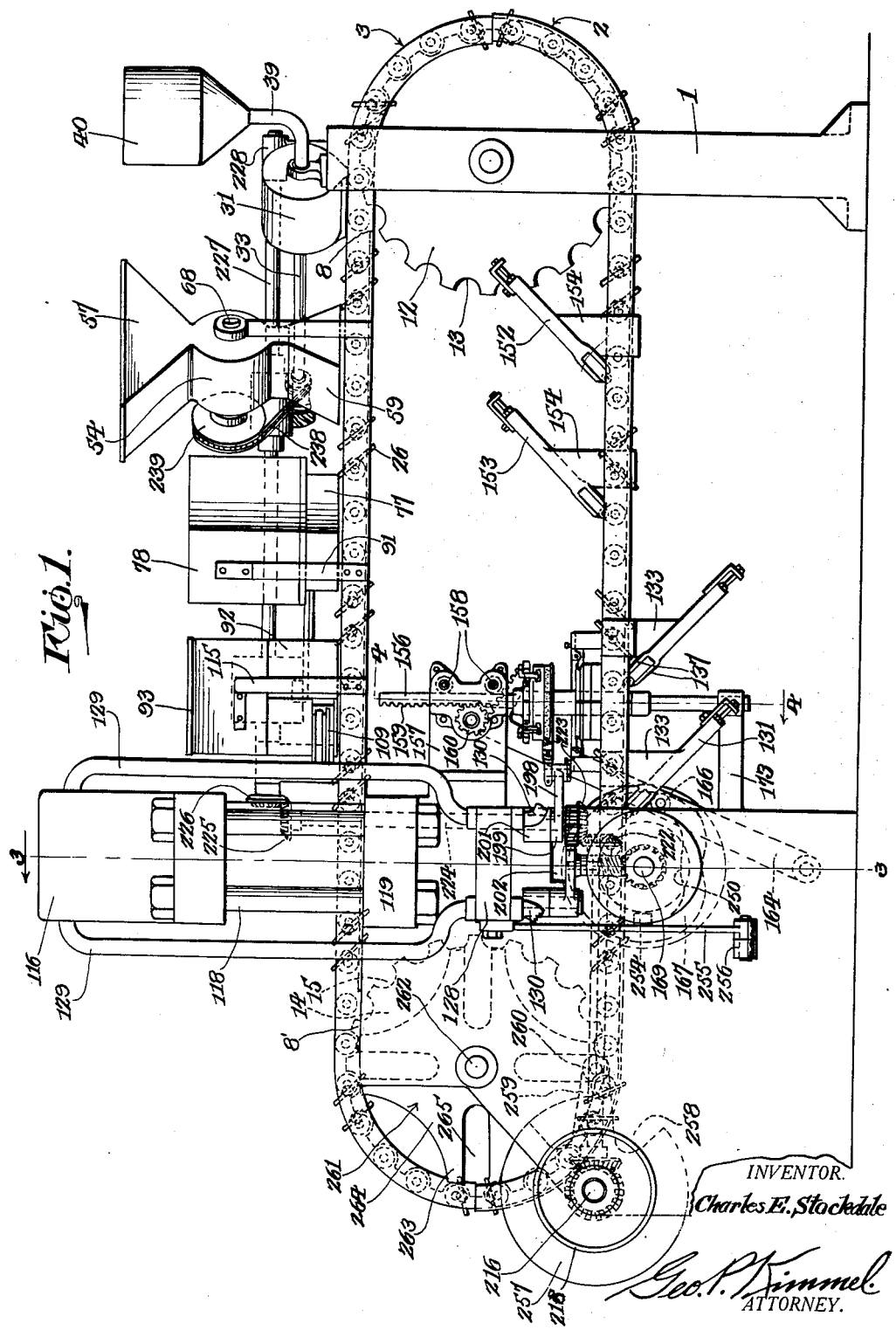

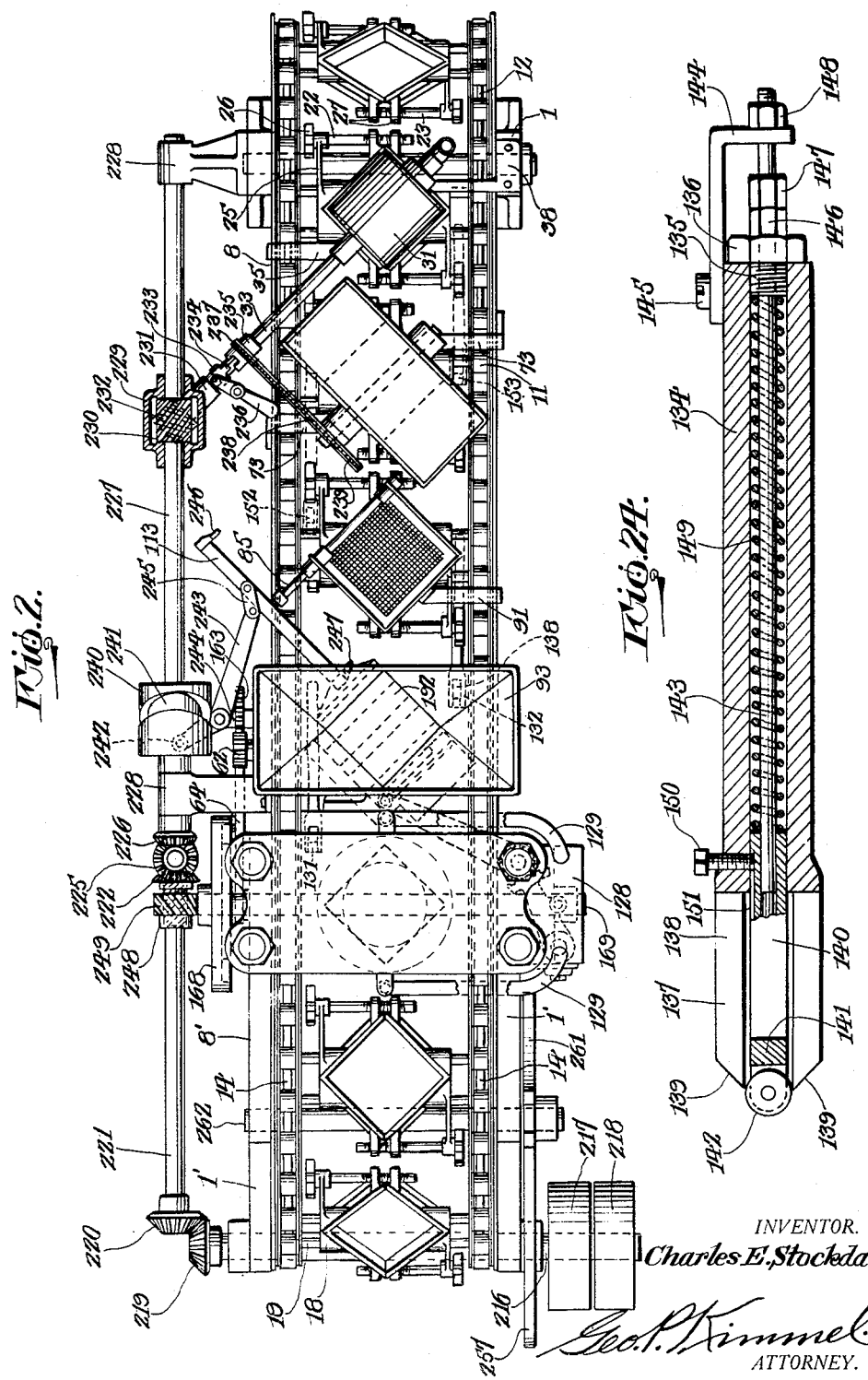

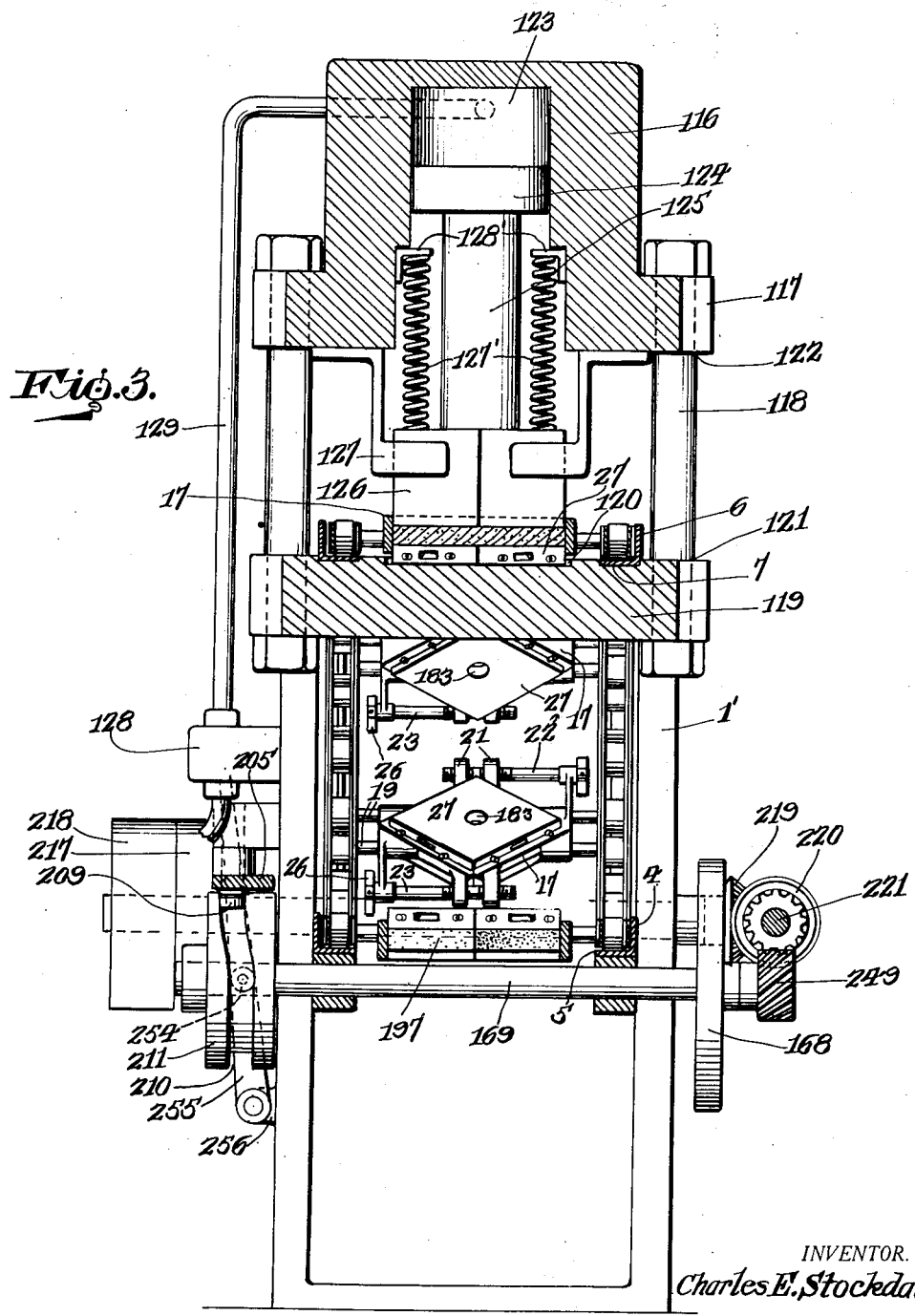

Dec. 8, 1931.      C. E. STOCKDALE      1,835,914
MACHINE FOR MAKING TILES
Filed Feb. 25, 1930      10 Sheets-Sheet 5
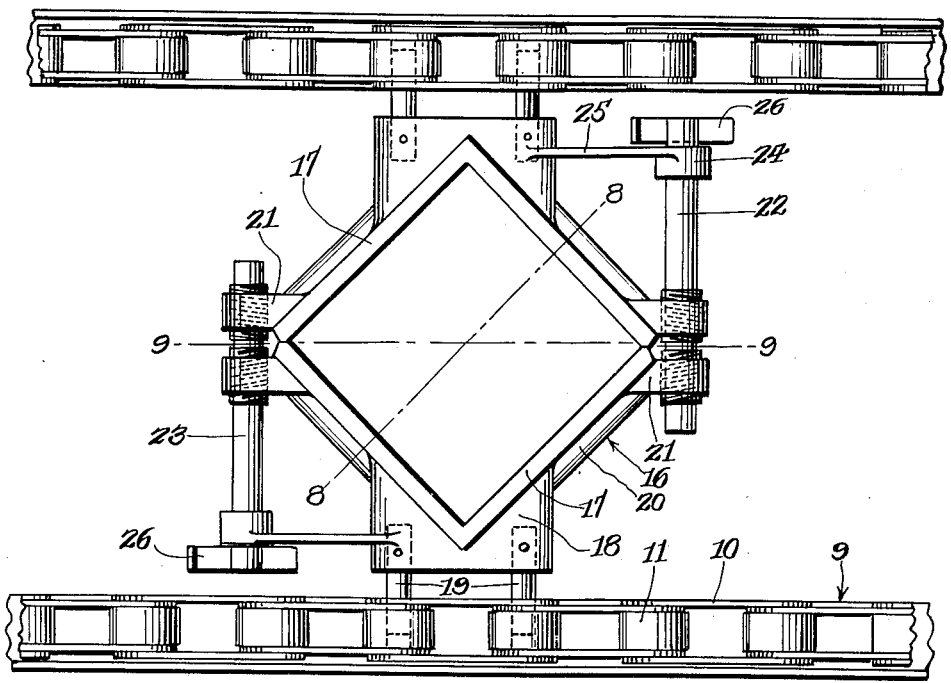
Fig.1.
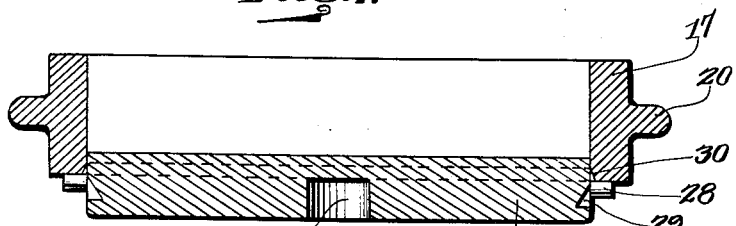
Fig.10.   Fig.8.   Fig.9.
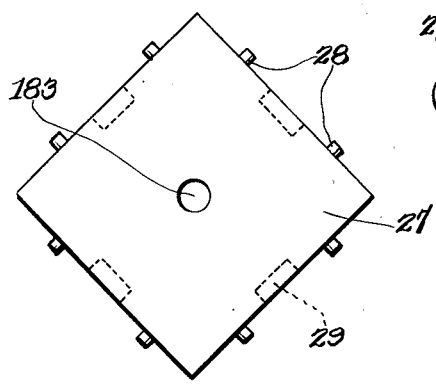
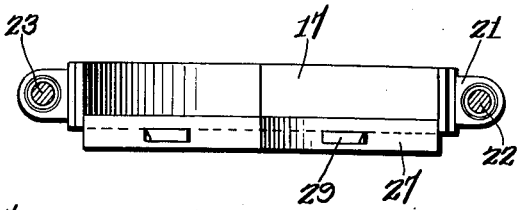
INVENTOR.
Charles E. Stockdale
BY
Geo. P. Kimmel
ATTORNEY.

Dec. 8, 1931.  C. E. STOCKDALE  1,835,914
MACHINE FOR MAKING TILES
Filed Feb. 25, 1930  10 Sheets-Sheet 6
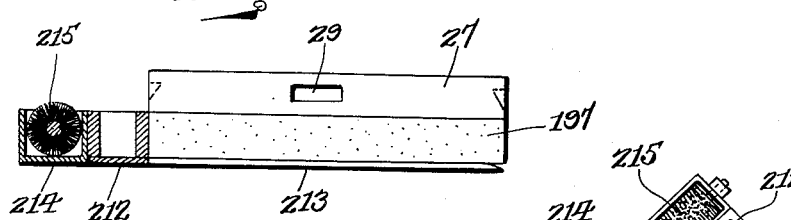
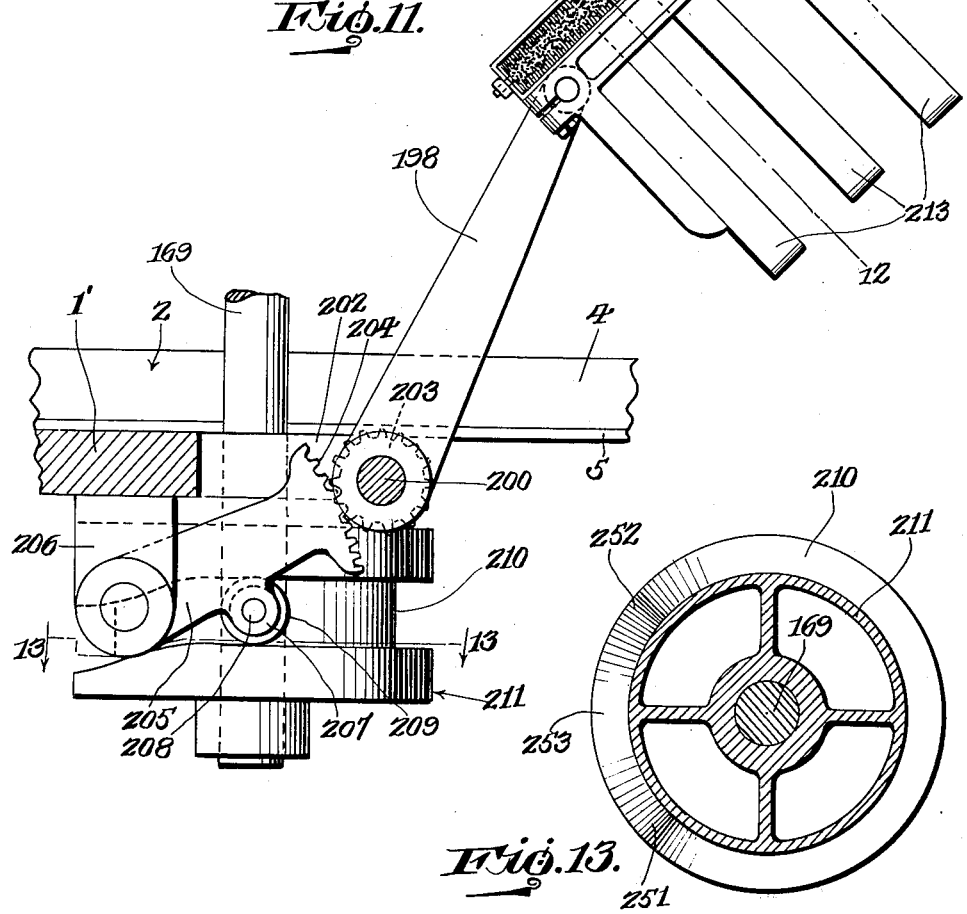
INVENTOR.
Charles E. Stockdale
BY
Geo. P. Kimmel
ATTORNEY.

Dec. 8, 1931. C. E. STOCKDALE 1,835,914
MACHINE FOR MAKING TILES
Filed Feb. 25, 1930 10 Sheets-Sheet 7
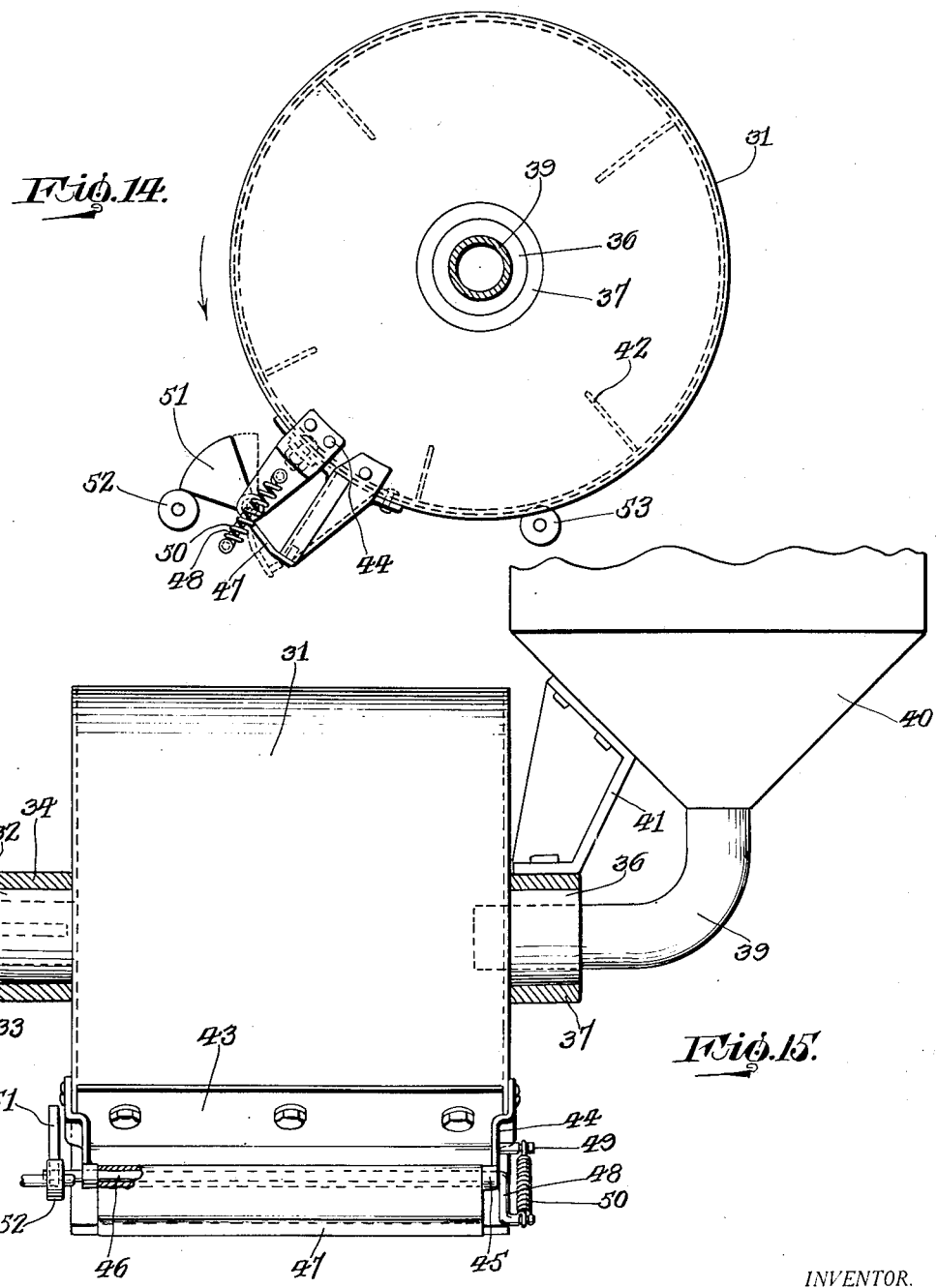
INVENTOR.
Charles E. Stockdale
BY
Geo. P. Kimmel
ATTORNEY.

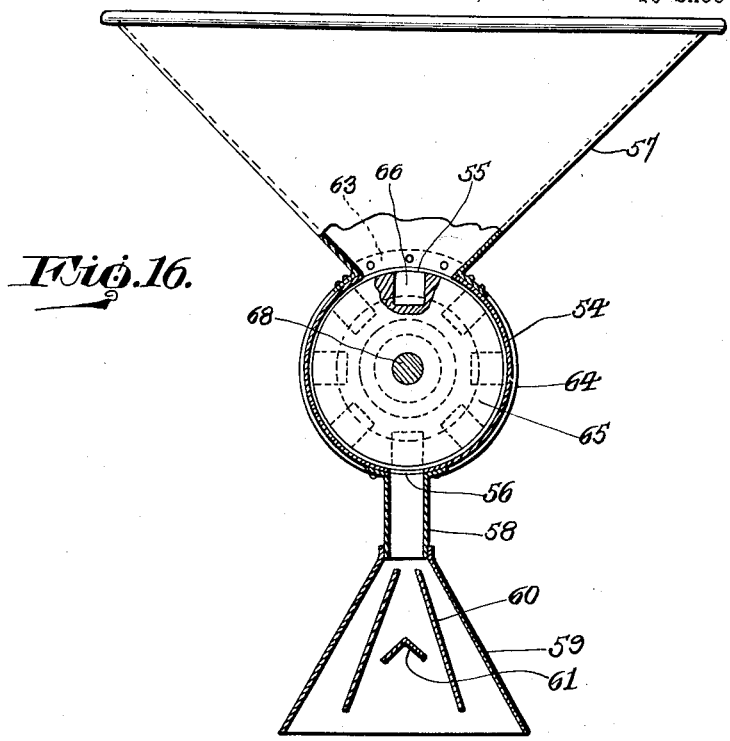
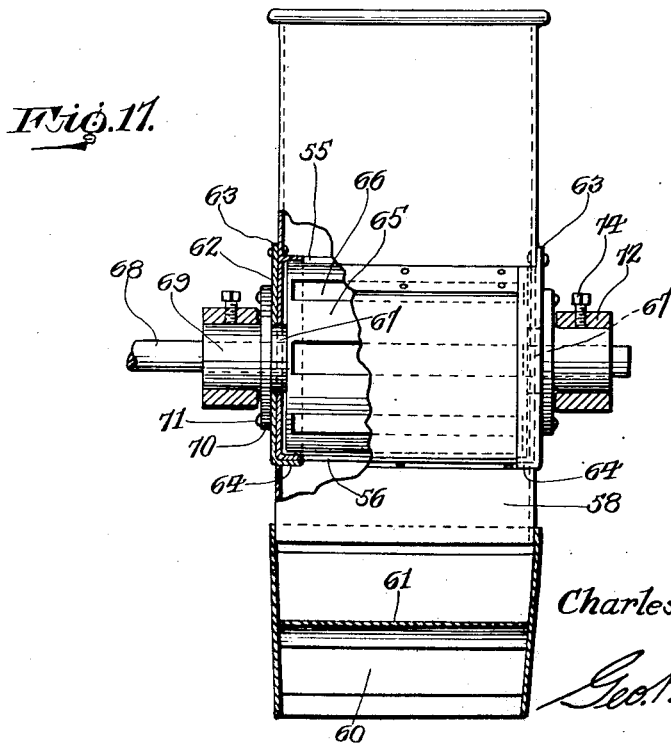

Dec. 8, 1931.    C. E. STOCKDALE    1,835,914
MACHINE FOR MAKING TILES
Filed Feb. 25, 1930    10 Sheets-Sheet 9
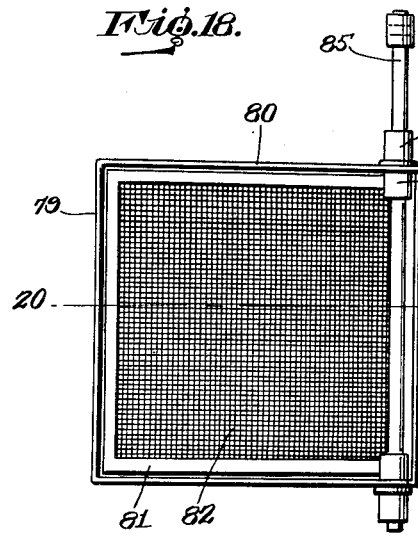
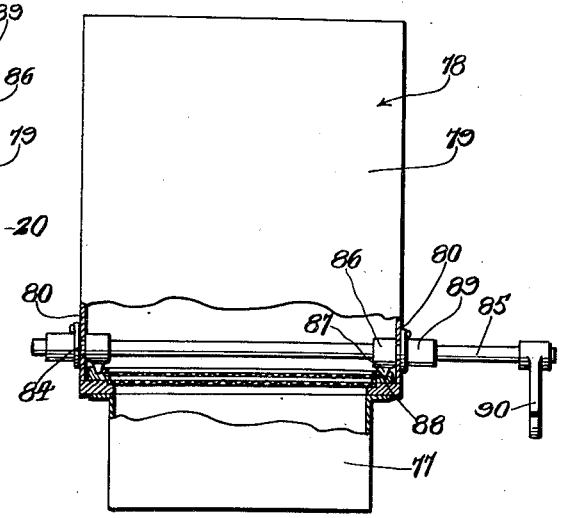
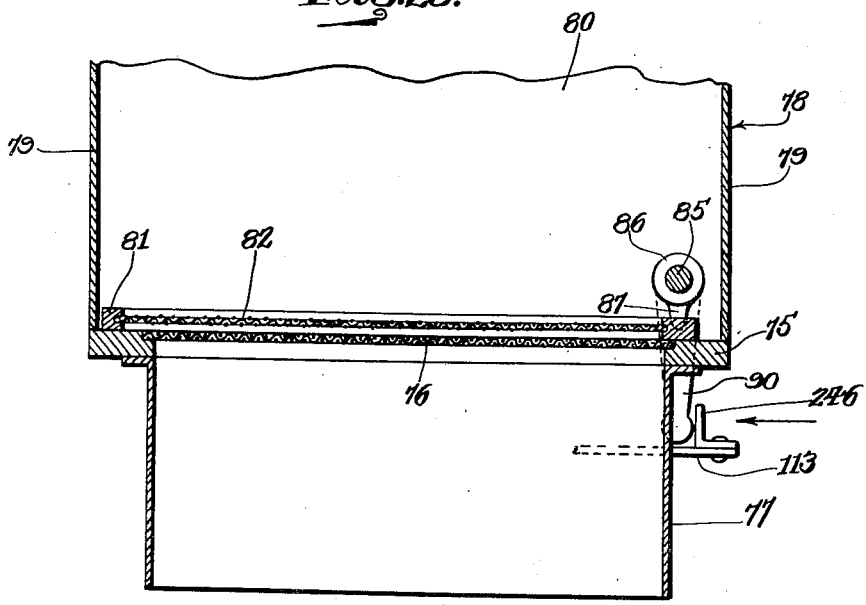
INVENTOR.
Charles E. Stockdale
BY
Geo. P. Kimmel
ATTORNEY.

Dec. 8, 1931. C. E. STOCKDALE 1,835,914
MACHINE FOR MAKING TILES
Filed Feb. 25, 1930  10 Sheets-Sheet 10
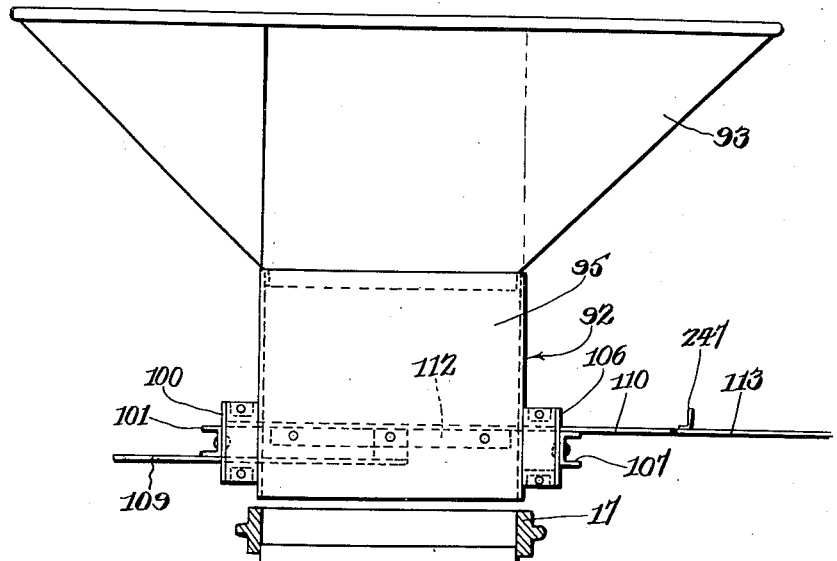
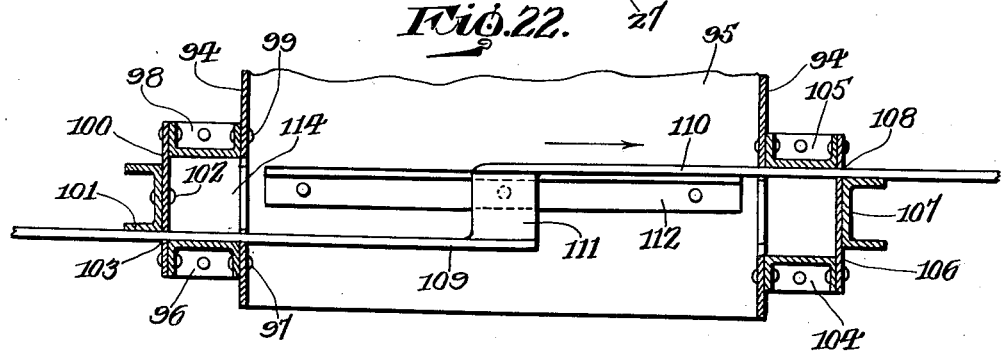
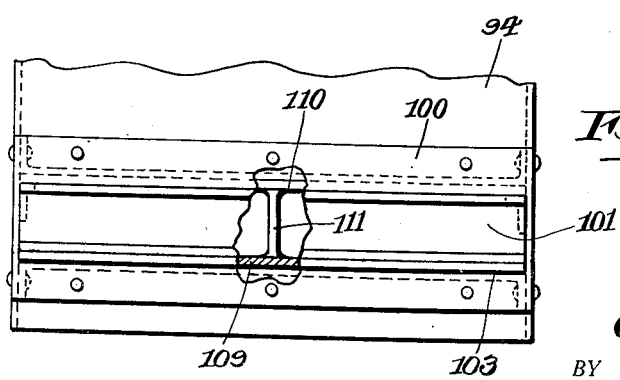
INVENTOR.
Charles E. Stockdale
BY
Geo. P. Kimmel
ATTORNEY.

Patented Dec. 8, 1931

1,835,914

UNITED STATES PATENT OFFICE

CHARLES E. STOCKDALE, OF MORGANTOWN, WEST VIRGINIA

MACHINE FOR MAKING TILES

Application filed February 25, 1930. Serial No. 431,246.

This invention relates to a machine for making tiles, commonly known as cement or concrete tiles, and used principally in the construction of floors and walls, although such tiles may be advantageously used for other purposes.

Tiles of the class above referred to are ordinarily hand made by skilled artisans, and are manufactured in solid colors as well as in various designs, both the solid color and design types having aggregates embedded in the exposed faces of the tile when such an effect is desired.

The primary object of the invention is to provide, in a manner as hereinafter set forth, a machine for making cement tiles of the solid color type, either with or without aggregates embedded in the exposed faces thereof, as desired, the entire operation of the machine being automatic from the depositing of the ingredients into molds to the removal of the uncured but otherwise finished tiles from the molds, thereby providing for the production of the tiles on a large scale and greatly decreasing the cost of the manufacture thereof.

A further object of the invention is to provide a machine for making tiles as aforesaid, by means of which uniformity in the tiles produced is assured, without relying upon the skill of the artisan to the same extent as is necessary when the tiles are made by hand.

With the foregoing and other objects in view, the invention consists of the novel construction, combination and arrangement of parts as hereinafter more particularly described, and as illustrated in the accompanying drawings wherein is shown an embodiment of the invention, but it is to be understood that the description and drawings are to be taken as illustrative and that the invention is intended to be limited only by the scope of the claims hereunto appended.

In the accompanying drawings in which like numerals are employed to designate like parts throughout the several views:—

Figure 1 is a side elevation of a machine in accordance with this invention.

Figure 2 is a top plan thereof.

Figure 3 is a section taken on the line 3—3 of Figure 1.

Figure 4 is a section taken at a point indicated by the line 4—4 of Figure 1.

Figure 5 is a detailed plan taken at a point indicated by the line 5—5 of Figure 4.

Figure 6 is a section taken at a point indicated by the line 6—6 of Figure 4.

Figure 7 is an enlarged plan of one of the molds mounted on the endless carrier.

Figure 8 is a section taken on the line 8—8 of Figure 7.

Figure 9 is a section taken on the line 9—9 of Figure 7.

Figure 10 is a bottom plan of the mold.

Figure 11 is an enlarged plan of the tile removing mechanism, showing the mounting and operating means therefor.

Figure 12 is a section taken on the line 12—12 of Figure 11.

Figure 13 is a section taken on the line 13—13 of Figure 11.

Figure 14 is an end elevation of the grout feeding mechanism.

Figure 15 is a sectional elevation thereof.

Figure 16 is a transverse sectional elevation of the aggregate feeding mechanism.

Figure 17 is a sectional side elevation thereof.

Figure 18 is a top plan of the rich mixture feeding mechanism.

Figure 19 is a sectional elevation thereof.

Figure 20 is an enlarged section taken on the line 20—20 of Figure 18.

Figure 21 is a side elevation of the lean mixture feeding mechanism.

Figure 22 is an enlarged, fragmentary sectional elevation thereof.

Figure 23 is a sectional elevation as viewed from a right angle to Figure 22.

Figure 24 is an enlarged, longitudinal section through one of the actuating arms for opening and closing the molds.

A tile making machine in accordance with this invention consists of an endless carrier having a plurality of separable molds mounted thereon, mechanisms for successively feeding grout, aggregates, a rich mixture of cement and sand, and a lean mixture of cement and sand into the molds, mechanism for pressing the contents of the molds, mechanisms for opening and closing the molds, removing the pressed tiles from the molds while the latter are open, and cleaning and oiling the molds while the latter are open, and driving means for automatically operating the aforesaid carrier and mechanisms in a continuous operation whereby each mold is treated by the several mechanisms in proper order.

Referring to the drawings in detail, with particular reference to Figures 1, 2 and 3, the numerals 1 and 1' respectively designate a pair of forward upright posts and a pair of rearward upright base plates upon which are mounted a pair of spaced tracks, each of which includes a lower section 2 and an upper section 3. The tracks are in the form of angle irons and each lower section 2 includes a vertically disposed portion 4 secured to a post 1 and plate 1', and a horizontally disposed portion 5 extending inwardly from the lower edge of the vertically disposed portion 4. The forward and rearward end portions of each of the lower sections 2 are curved upwardly whereby the end faces of the lower sections are disposed horizontally. Each of the upper sections 3 consists of a vertically disposed portion 6 secured to a post 1 and plate 1', and a horizontally disposed portion 7 extending inwardly from the lower edge of the portion 6. The end portions of each upper section 3 are curved downwardly whereby the end faces of the sections are disposed horizontally, such end faces being seated upon the end faces of a lower section 2. The portion 7 of each upper section 3 extends from a point spaced from the forward end thereof and indicated at 8 to a point removed from the rearward end thereof and indicated at 8'.

Mounted on each set of opposing upper and lower sections of the tracks is an endless chain 9 which consists of a plurality of links 10 pivotally connected at their ends and having a roller 11 mounted on each pivotal connection. The construction of the chains 9 is best shown in Figure 7. The rollers 11 of the upper stretch of each chain is in rolling contact with the portion 7 of an upper section 3 of the track, and the rollers 11 of the lower stretch of each chain are in rolling contact with the portion 5 of a lower section 2. At the forward end thereof, each chain passes around an idler 12, a marginal portion of which projects above the forward end 8 of the portion 7, and which is formed in its periphery with a series of spaced grooves 13 for the reception therein of the rollers 11 as the chain passes over the idler.

At the rearward end thereof, each chain passes over an actuating gear 14 which is provided in its periphery with a series of spaced grooves 15 for engagement with the rollers 11. The upper portion of the actuating gear 14 is disposed between the rearward end of the portion 7 of the upper section of a track, such rearward end being indicated at 8, and the rearward end of an upper section.

Mounted on and connecting the chains 9 are a plurality of spaced molds 16, one of which is best shown in Figures 7 to 10. The sides of each mold consist of a pair of oppositely disposed, angular sections 17, each of which is formed with a laterally projecting boss 18 having a pair of spaced studs 19 fixedly secured thereto and rotatably mounted at their outer ends within a pair of adjacent rollers 11. Each section 17 is further formed with a reinforcing rib 20. Adjacent the ends of each section 17 are a pair of apertured lugs 21 which are disposed in longitudinal alignment and in parallel relation to the chains 9. The apertures in the lugs 21 of one section 17 of each mold are formed with right hand threads, and the apertures in the lugs 21 of the opposite section 17 are formed with left hand threads. Extending through the opposing lugs of the sections 17 are a pair of stub-shafts 22 and 23, each of which is provided with right and left hand threads for engagement with the right and left hand threads respectively of the lugs through which it extends. Spaced from the outer end thereof, each of the stub-shafts is rotatably mounted in a bearing 24 formed on an arm 25 projecting from a boss 18. Fixedly secured on the outer end of each of the stub-shafts is a transversely disposed finger 26.

Secured between the sections 17 of each mold is a bottom 27 from each side edge of which projects a pair of spaced pins 28. Between the pair of pins 28, each edge face of the bottom 27 is formed with a notch 29. The bottom 27 is adapted to be inserted into position between the sections 17 from the lower edges of the latter and the inner faces of the sections 17 are cut away at their lower edges as indicated at 30 to facilitate the insertion of the bottom 27 between the sections 17.

Grout feeding mechanism

This mechanism, better shown in Figures 1, 2, 14 and 15, is located above the endless carrier and includes a cylindrical drum 31 which is diagonally disposed with respect to the carrier. At one end thereof the drum 31 is formed with a hub 32 which is mounted on a shaft 33 to rotate therewith. The hub 32 is rotatably mounted within a bearing 34 formed on a bracket 35 secured to one of the upper sections 3 of the tracks. At the upper end thereof the drum 31 is formed with a hub 36 which is rotatably mounted in a bearing 37 formed on a bracket 38 mounted on one of the supports 1. Loosely extending through the hub 36 and through an end wall of the drum is the discharge pipe 39 of a hopper 40 for containing the ingredient to be discharged from the drum. The hopper 40 is supported on a suitable web 41 which is secured to the bearing 37. Formed on the inner peripheral face of the drum are a plurality of radially projecting baffle plates 42.

Projecting from the outer peripheral face of the drum is a trough 43 which is in communication with the interior of the drum and which is open at its outer side. Projecting radially and outwardly from the end walls of the drum are a pair of brackets 44 which are formed with bearings 45 through which a rod 46 rotatably extends. Fixedly mounted on the rod 46 to move therewith is a cover 47 for the open outer side of the trough.

Formed on one end of the rod 46 is a crank 48 which is connected with a pin 49 projecting from a bracket 44 by means of a coiled spring 50. The rod 46, crank 48 and pin 49 are relatively arranged so that the tension of the spring 50 will maintain the cover portion 47 either in open or closed position. Fixedly secured to the opposite end of the rod 46 is a substantially fan-shaped actuating element 51.

In operation, the drum 31 rotates in a counter-clockwise direction as viewed in Figure 14 and just before the trough 44 reaches a position over one of the molds 16, the actuating element 51 is brought into contact with a stop 52 suitably supported upon the frame work of the machine. The contact of the element 51 with the stop 52 rotates the shaft 46 to swing the cover 47 to open position as the trough 44 reaches a position directly over a mold. The cover 47 is held in open position by means of the spring 50 until the inner face of the actuating element 51 is brought into contact with a stop 53 suitably supported from the frame work of the machine. The contact of the element 51 with the stop 53 rotates the rod 46 in a reversed direction to swing the cover 47 to closed positon, and the cover is held in closed position by the spring 50 until the actuating element 51 is again brought into contact with the stop 52.

*Aggregate feeding mechanism*

This mechanism, better shown in Figures 1, 2, 16 and 17, is located above the endless carrier and includes a cylindrical body 54 diagonally disposed with respect to the carrier. The body 54 is formed at its top with a relatively wide, lengthwise extending opening 55, and is formed at its bottom with a narrower, lengthwise extending opening 56. Secured to the body 54 and projecting upwardly therefrom is a hopper 57, the bottom of which is in registry with the opening 55 and which is adapted to contain the ingredients to be fed through this mechanism.

Secured to the body 54 and depending therefrom, is a discharge spout 58, the upper end of which is in registry with the opening 56. In communication with the spout 58 and depending therefrom is a downwardly flaring discharge hopper 59, the bottom of which is of the same size as the molds carried by the carrier, and the lower edge of which is in registry with the walls of a mold when the latter is positioned thereunder. Disposed within the hopper 59 are a pair of upwardly converging, spaced baffle plates 60, between which is positioned an angular baffle plate 61. Secured to each end wall of the body 54 is a circular plate 62 which is provided at its upper edge with an extension 63 secured to the hopper 57. Between the hoppers 57 and 59, the plate 62 is formed with a pair of inwardly extending, arcuate flanges 64 which conform in contour with and bear against the outer face of the body 54.

Rotatably mounted within the body 54 is a solid drum 65 which is formed in its periphery with a series of spaced, lengthwise extending recesses 66. At the ends thereof, the drum 65 is formed with hub members 67 which project through the end walls of the body 54 and through the plates 62. Extending through the drum 65 and fixedly secured thereto for unitary rotation is a rotatable shaft 68. Rotatably mounted on the shaft 68, on either side of the body 54, is a collar 69 which is formed at its inner end with a radially disposed flange 70 fixedly secured to a plate 62 by means of suitable holdfast devices 71. The collars 69 extend through and are supported by apertured heads 72 formed on suitable supporting brackets 73 mounted on the upper sections 3 of the tracks. Rotation of the collars 69 is prevented by means of suitable set screws 74 which are threaded through the walls of the heads 72 into engagement with the collars 69.

*Rich mixture sifting and feeding mechanism*

This mechanism, better shown in Figures 1, 2, 18, 19 and 20, is located over the endless carrier and includes a horizontally disposed stationary frame 75, the inner face of which is rabbeted to receive marginal portions of a screen 76. Secured to the lower face of the frame 75 and depending therefrom is a rectangular apron 77 which is open at its top and bottom. The apron 77 is of the same size as the molds carried by the carrier and the lower edge of the apron is in registry with the walls of a mold when the latter is brought thereunder. Mounted on the frame 75 and projecting upwardly therefrom is a rectangular body 78 which is open at its top and bottom. The body 78 in the embodiment shown is square in cross section, but for convenience in referring to the drawings, the walls 79 of the body will be termed end walls, and the walls 80 will be termed side walls.

Slidably mounted on the frame 75 is a movable frame 81, the inner face of which is rabbeted to receive marginal portions of a screen 82. The frame 81 is of less length than the frame 75 in order that it may have a reciprocating movement between the walls 79 of the body 78. In spaced relation to the frame 81, the side walls 80 of the body are formed with openings 84 through which extends a rocket shaft 85, upon which is fixedly mounted a pair of collars 86 which are disposed adjacent the inner faces of the side walls 80. The collars 86 are formed with projections 87 which project downwardly into recesses 88 formed in the upper face of the frame 81. The rocket shaft 85 is mounted in a pair of bearings 89 which are secured to the outer faces of the walls 80. Fixedly mounted on one end of the rod 85 is a downwardly projecting arm 90. This feeding mechanism may be supported in any suitable manner, as by means of a bracket 91 mounted on one of the upper sections 3 of the tracks.

*Lean mixture feeding mechanism*

This mechanism, better shown in Figures 1, 2, 21, 22 and 23, is located above the endless carrier and includes a rectangular body 92 open at its top and bottom. The body 92 is of the same size as the molds carried by the carrier and is diagonally disposed with respect to the carrier in order that the lower edge of the body 92 will be in registry with the walls of a mold when the latter is brought thereunder. Disposed over the body 92 is a laterally flared, elongated hopper 93 which is disposed transversely of the carrier and projects beyond the sides of the latter.

Although the body 92 is square in cross section, for convenience in referring to the drawings the walls 94 of the body will be designated end walls, while the walls 95 of the body will be designated side walls. Extending across one of the end walls 94, in spaced relation to the lower edge thereof, is an inverted, U-shaped angle iron 96 having one of its flanges secured to such end wall 94 by means of suitable holdfast devices 97. Disposed above the angle iron 96, in spaced relation thereto, is a U-shaped angle iron 98 which has one of its flanges secured to the wall 94 by means of suitable holdfast devices 99. Secured to the outer faces of the angle irons 96 and 98, and connecting the angle irons together, is a plate 100. Extending lengthwise of the plate 100 is a semi-inverted, U-shaped angle iron 101, the base of which is connected with the plate 100 by means of suitable holdfast devices 102. The lowermost flange of the angle iron 101 is disposed in a horizontal plane spaced slightly above the horizontal plane of the base of the angle iron 96. Between the horizontal plane of the lowermost flange of the angle iron 101 and the horizontal plane of the base of the angle iron 96, the plate 100 is formed with an elongated slot 103. Secured to the opposite end wall 94 are a pair of angle irons 104 and 105 similar to the angle irons 96 and 98 and connected together by means of a plate 106.

Secured to the plate 106 is a semi-inverted, U-shaped angle iron 107 which is arranged with its uppermost flange in a horizontal plane spaced below the horizontal plane of the base of the angle iron 105. Between the horizontal planes of the upper flange of the angle iron 107 and the base of the angle iron 105, the plate 106 is formed with an elongated slot 108.

Disposed within the body 92 is a measuring device which is in the form of a pair of spaced plates 109 and 110 respectively extending through the slots 103 and 108. The inner ends of the plates 109 and 110 are disposed in overlapping relation and the overlapping portions are connected together by means of a vertical web 111 which extends longitudinally of the plates midway between the side edges of the latter. Secured to each side wall 95 is an angle iron 112 which provides a support for the uppermost plate 110. Formed integrally with the plate 110 is an actuating bar 113 for reciprocating the measuring device. Formed in each of the end walls 94 is an I-shaped slot 114 for the reception therethrough of the plates 109 and 110, and web 111 when the measuring device is reciprocated. This mechanism may be supported upon suitable brackets, such as 115, extending upwardly from the upper sections 3 of the tracks and secured to the hopper 93.

*Mechanism for pressing the contents of the molds*

This mechanism is shown in Figures 1, 2 and 3 and is in the form of a hydraulic press including a cylinder head 116 formed with a plurality of laterally projecting apertured ears 117 through which upper end portions of supporting posts 118 extend. The lower end portions of the posts 118 extend through a base block 119 which extends transversely of the base plates 1' and is countersunk in the upper edges thereof. The block 119 is formed in its upper face with a recess 120 which is adapted to receive the bottom 27 of a mold therein. The posts 118 are formed with central portions of increased diameter to provide shoulders 121 and 122 respectively seating on the base block 119 and having the ears 117 seated thereon.

The cylinder head 116 is formed with a vertically disposed cylinder 123 within which is mounted for reciprocation a piston 124 from which depends a shank 125 formed at its lower end with a press block 126. The press block 126 is vertically slidable between guides 127 depending from the cylinder head 116 and is normally maintained in raised position by means of relatively heavy springs 127', the respective ends of which abut against the upper face of the block 126 and brackets 128' projecting inwardly from the cylinder head 116. The lower face of the block 126 is of the same size and contour as the interior measurements of a mold and is disposed in a manner to be snugly received within the side walls of a mold when the latter is positioned in the recess 120. Upon the lowering of the press block 126 into a mold, the content of the latter is firmly pressed against the bottom of the mold owing to the base block 119 which rigidly supports the mold.

Projecting laterally from one of the base plates 1' is a housing 128, the interior of which provides a valve chamber. Connecting the valve chamber with the cylinder 123 are a pair of fluid conduits 129, and connecting the valve chamber with a suitable source of fluid pressure supply, not shown, are a pair of fluid conduits 130.

*Mechanism for opening and closing the mold sections*

This mechanism is better shown in Figures 1, 2 and 24 and includes a pair of upwardly and rearwardly inclined actuating members 131 and 132 secured to brackets 133 depending from the lower sections 2 of the tracks. Each of said actuating members consists of an elongated, hollow body 134 having a sleeve 135 threaded in the rearward end thereof, said sleeve being provided with a polygonal shaped head 136. Projecting from the forward end of the body 134 is a pair of relatively wide arms 137 arranged in spaced, superposed relation. The arms 137 are formed with relatively wide slots 138 which extend throughout the length of the arms. At the outer ends thereof, the arms are bevelled as indicated at 139.

Slidably extending into the forward end of the body 134 is the stem 140 of a yoke 141, within the bifurcated end of which is rotatably mounted a roller 142. Disposed within the body 134 is a rod 143, the forward end of which slidably extends into an elongated recess formed centrally of the stem 140 and extending lengthwise thereof. The rearward end of the rod 143 extends through the sleeve 135 and through a bracket 144 secured to the body 134 by means of a suitable holdfast device 145. Threaded on the rod 143, between the bracket 144 and head 136 is an adjusting nut 146 and a lock nut 147. Threaded on the outer end of the rod 143 is a nut 148 which bears against the rearward face of the bracket 144. Disposed within the body 134, and encircling the rod 143, is a coiled spring 149, the respective ends of which abut the sleeve 135 and the rearward end of the stem 140 of the yoke 141. The spring 149 normally exerts a forward pressure on the stem 140 and the latter is prevented from being forced out of the body 134 by means of a set screw 150 which is threaded through the wall of the body into engagement with a groove 151 formed in the outer face of the stem 140.

The actuating members 131 and 132 respectively are disposed within the paths of travel of the fingers 26 carried by the shafts 22 and 23 respectively of the molds. The members 131 and 132 are arranged relative to each other in a manner to simultaneously engage the fingers 26 of the shafts 22 and 23. Reference to Figure 1 will disclose that the fingers 26 of both the actuating members have a forward and downward inclination. When the lower ends of the fingers 26 are brought into contact with the rollers 142, the fingers 26 are swung through an arc of substantially 90°, whereby the shafts 22 and 23 are rotated in a manner to separate the sections 17 of the molds.

Arranged in spaced relation to the actuating members 131 and 132 respectively are a pair of actuating members 152 and 153 which are of the same construction, but which are disposed at a downward and rearward inclination. The members 152 and 153 are mounted on brackets 154 extending upwardly from the lower sections 2 of the tracks. The fingers 26 approach the actuating members 152 and 153 at forward and upward inclinations and are swung by the rollers carried by the actuating members, whereby the shafts 22 and 23 are rotated in a manner to close the sections 17 of the molds.

*Mechanism for separating the bottoms of the molds from the open mold sections*

This mechanism is better shown in Figures 1, 2, 4 and 6 and consists of a spider having its hub 155 fixedly mounted on the lower end of a rack bar 156 slidably mounted in a guide 157 suitably supported from the frame of the machine. The forward face of the rack bar 156 is in contact with a pair of guide rollers 158 rotatably mounted on the guide 157, and the rearward face of the rack bar is formed with teeth 159 which are in mesh with a gear 160 mounted on one end of a shaft 161, upon the other end of which is mounted a pinion 162. In mesh with the pinion 162 are the teeth of a rack arm 163 formed on a lever 164, the lower end of which is pivoted to one of the base plates 1'. Intermediate the ends thereof, the lever 164 is provided with a laterally projecting pin 165 which carries a roller 166 operating in the groove 167 of a cam 168 which is mounted on a transversely extending shaft 169.

Fixedly secured to the hub 155 is one end of a yoke 170, the opposite end of which is fixedly secured to a rod 171 slidably mounted in a cross member 172 which is supported on brackets 173 projecting from the base plates 1'. The spider is provided with four horizontally disposed arms 174 upon the outer ends of which are pivotally mounted fingers 175. Each finger 175 is provided adjacent its lower end with an inwardly extending nose 176, and is further formed at its upper end with an outward projection 177.

Disposed in vertical alignment with the projections 177 are stops 178 which are of elongated formation and are pivoted between their longitudinal centers and their outer ends to a frame 179 mounted on the lower sections 2 of the tracks. The inner end portions of the stops 178 are of greater thickness than the outer end portions thereof, and the inner ends of the stops are upwardly and inwardly inclined as indicated at 180. Bearing against the outer end portions of the stops 178 are adjusting screws 181 which are threaded through the frame 179. The rack bar 156 is formed at its lower end with an extension 182 for entering a recess 183 formed centrally of the bottom 27 of each mold for the purpose of centering the bottom 27 with respect to the spider when a mold is brought thereunder. The spider is adapted to be reciprocated by the rack bar 156 in order to lift the mold bottoms 27 from the sections 17 in a manner to be hereinafter more particularly described.

*Mechanism for cleaning and oiling the open mold sections*

This mechanism, better shown in Figures 1, 4 and 5, consists of an oil pan 184 fixedly mounted on the upper end of the vertically slidable rod 171. The oil pan is of rectangular contour and of appropriate size to fit snugly between the sections 17 of a mold when the latter is brought thereover. Slidably mounted in and projecting upwardly from the upper end of the rod 171 is a pin 185 upon which is fixedly mounted a spider 186 connecting the sides of a frame 187. The frame 187 is provided on its outer face with bristles 188 which project laterally beyond the outer side faces of the oil pan. The spider 186 is secured in position on the pin 185 by means of a nut 189 threaded on the upper end of the pin.

Arranged in spaced, parallel relation to each side wall of the pan 184 is a pivot pin 190, which is suitably secured to the pan 184, and upon which is pivotally mounted a bell crank 191, the inner end portions of the bell cranks extending inwardly and terminating in rounded heads 192 disposed within the groove of a spool 193 formed integrally with the pin 185 beneath the spider 186. The outer end portion of each bell crank 191 is bifurcated and extends upwardly and outwardly and has secured thereto an elongated bar 194. The bars 194 in their assembled relation provide a frame disposed above the frame 187, and each bar is provided on its outer face with an oil retaining lining 195, preferably formed of felt. The linings 195 are supplied with oil by means of a wick 196 which extends into the interior of the oil pan 184.

As previously stated, the slidable rod 171 is operatively connected with the spider hub 155 by means of the yoke 170. Upon the upward movement of the spider arms 174, the oil pan 184 and mechanism associated therewith is forced upwardly between the separated sections 17 of the mold from which the bottom 27 with the pressed tile 197 clinging thereto has been removed.

Upon the upward stroke of the oil pan and its associated mechanism, the spool 193 is seated on the upper end of the rod 171, in which position the linings 195 are disposed inwardly with respect to the outer ends of the bristles 188, in which position the linings 195 are maintained out of contact with the mold sections 17. The bristles 188 are drawn across the faces of the mold sections 17 to clean the latter during this upward movement. Upon the downward movement of the oil pan and its associated mechanism, the frame 187 is momentarily stopped by the resistance of the mold sections 17 to the bristles 188 whereby the rod 171 is moved away from the spool 193 which actuates the bell cranks 191 to force the bars 194 outwardly whereby the linings 195 are projected into a position with their outer faces flush with the outer ends of the bristles 188. The entire mechanism then moves downwardly as a unit whereby the inner faces of the mold sections 17 are subjected to another cleaning by the bristles 188, and also are oiled by the linings 195.

*Mechanism for removing the tiles from the bottoms of the molds and for cleaning the latter*

This mechanism, better shown in Figures 1, 2, 4, 11 and 12, includes a horizontally disposed lever 198 formed on one end with a head 199 rotatably mounted on a pivot pin 200 projecting from a bearing 201 formed integrally with one of the base plates 1' and projecting into an opening 202 formed in such plate at the forward edge of the latter. Formed integrally with the head 199 is a gear 203 which is in mesh with the teeth 304 on one end of a rack arm 205, the opposite end of which is pivotally connected to a bearing 206 formed integrally with the base plate 1', adjacent the rearward end of the opening 202. The rack arm 205 is disposed at a forward and inward inclination with the end thereof upon which the teeth 204 are formed projecting into the opening 202.

Intermediate the ends thereof, the rack arm 205 is provided with a laterally projecting ear 207 which is provided with a pivot pin 208 upon which is rotatably mounted a roller 209 disposed within the groove 210 of a cam 211 which is fixedly mounted on the shaft 169, and which will be hereinafter more particularly described.

Rigidly connected with the free end of the lever 198 is an angularly disposed, elongated member 212 which is U-shaped in cross section. Flush with the bottom of the member 212 and projecting laterally therefrom are a plurality of spaced arms 213, the length of which corresponds to the width of the bottoms 27 of the molds. The upper faces of the arms 213 are spaced from the upper faces of the member 212 a distance substantially equal to the thickness of the pressed tiles 197. Secured to the member 212, on the opposite side thereof from the arms 213, is a holder 214 which is adapted to contain oil and within which is disposed a cylindrical brush 215. The brush 215 is of a diameter greater than the height of the member 214 whereby a peripheral portion of the brush 215 projects above the upper face of the holder 214. Upon the actuation of the lever 198 in a manner to move the arms 213 toward the lifted bottom 27 of a mold, the arms 213 are passed beneath the pressed tile 197 to support the latter and the member 212 is forced against an edge face of the tile to remove the latter from the bottom 27 of the mold. As the tile is removed from the mold bottom by the member 212, the brush 215 is drawn across the face of the bottom to clean and oil the latter. Upon the return movement of the lever 198 to restore the member 212 to its original position, the brush 215 is again drawn across the face of the mold bottom whereby the latter is subjected to a further cleaning and oiling.

Driving mechanism

This mechanism provides for the simultaneous operation of the endless carrier and the mechanism for opening and closing the sections of the molds, and for the simultaneous operation of the feeding, pressing, tile removing, and mold cleaning and oiling mechanisms, the endless carrier and opening and closing mechanism being actuated alternately with respect to the other mechanisms. The driving mechanism consists of a main drive shaft 216 which is located at the rearward end of the machine and is rotatably mounted in the base plates 1'. At one end thereof the shaft 216 is provided with fast and loose pulleys 217 and 218 respectively which are adapted to be engaged by a driving belt, not shown. At the opposite end thereof, the shaft 216 is provided with a beveled gear 219 which is in mesh with a beveled gear 220 fixed on the rearward end of a forwardly extending, horizontally disposed shaft 221, the forward end of which is provided with a beveled gear 222. Meshing with the beveled gear 222 is a beveled gear 223 which is fixed on the lower end of a vertically disposed shaft 224, upon the upper end of which is secured a beveled gear 225. Meshing with the beveled gear 225 is a beveled gear 226 fixedly secured to the rearward end of a forwardly extending, horizontally disposed shaft 227 which is mounted in a pair of bearings 228.

Spaced from the forward end thereof, the shaft 227 is provided with a housing 229 within which is disposed a worm 230 formed on the shaft 227. Extending into the housing 229 is a stub-shaft 231 which is provided with a worm 232 meshing with the worm 230. Adjacent the opposite end thereof the stub-shaft 231 is provided with a slidable collar 233 which is formed with a clutch face 234. The stub-shaft 231 is rotatably supported at one end within a clutch element 235 which is fixedly mounted on the outer end of the shaft 33. The collar 233 may be brought into engagement with the clutch element 235 to cause unitary rotation of the shaft 231 and shaft 33 by means of a lever 236 which is pivotally mounted intermediate its ends.

Fixedly mounted on the clutch element 235 is a sprocket 237 which is operatively connected by means of an endless chain 238 with a sprocket 239 fixedly mounted on the shaft 68.

Mounted on the shaft 227 to rotate therewith is a cam element in the form of a cylindrical drum 240 which is formed in its periphery with a diagonally disposed, circumferentially extending groove 241. Operating within the groove 241 is the roller 242 of a bell crank 243 which is pivotally mounted intermediate its ends on a bracket 244 projecting from one of the upper sections 3 of the tracks. The opposite end of the bell crank 243 is pivotally connected to one end of a link 245, the opposite end of which is pivotally connected with the actuating bar 113 which is formed integrally with the upper plate 110 of the measuring device for the lean mixture feeding mechanism. The actuating bar 113 is provided at its ends with laterally offset and upwardly extending lugs 246 and 247, within the path of travel of which the projection 90 of the shaft 85 extends.

The horizontally disposed shaft 221 is provided with a worm 248 which is in mesh with a worm 249 formed on one end of the transversely extending shaft 169. The cam element 168 is fixedly mounted on the shaft 169 adjacent the worm 249, and such cam element is in the form of a disk. The groove 167 within the cam element 168 is formed in a side face of the latter and is of irregular contour as indicated at 250 in order that the lever 164 may be oscillated by the rotation of the cam element. The cam element 211 is fixedly mounted on the opposite end of the shaft 169, such cam element being in the form of a cylindrical drum formed in its periphery with the groove 210 heretofore mentioned. The groove 210 extends in parallel relation to the side faces of the element 211 throughout the greater portion of the length of the groove but is inclined toward the outer face of the element 211 at two spaced points 251 and 252, such inclined portions merging into a portion 253 which is disposed in parallel relation to the side faces of the element 211 but is disposed outwardly with respect to the remaining portions of the groove.

As heretofore stated, the roller 209 carried by the rack arm 205 operates within the groove 210, and also operating within the groove 210 is a roller 254 projecting laterally from a lever 255, one end of which is pivotally connected to a boss 256 formed on one of the base plates 1', and the opposite end of which is operatively connected with the valve chamber 128 for controlling the operation of the valves within the latter.

Fixedly mounted on the main drive shaft 216 is a substantially disk-shaped element 257 formed in its periphery with a recess 258 from which projects an arm 259 upon the outer end of which is mounted a roller 260. Actuated by the element 257 is a driving element 261 for the shaft 262 upon which the gears 14 are mounted. The element 261 is fixedly mounted on the shaft 262 and is substantially in the form of a cross, the arms 263 of which are formed integrally with connecting webs 264. The arms 263 are formed with elongated slots 265 which extend from the ends of the arms toward the shaft 262. Upon rotation of the element 257, the roller 260 is brought into engagement successively with the slots 265 whereby the driving element 261 is rotated one-quarter of a revolution for each revolution of the element 257.

In the operation of the machine the endless carrier is actuated in a counter-clockwise direction as viewed in Figure 1. The grout feeding, aggregate feeding, rich mixture feeding, lean mixture feeding, and pressing mechanisms are disposed with respect to each other in a manner to be respectively aligned with adjacent molds 16. During each revolution of the driving element 257, each mold is moved a distance equal to the distance between the above-mentioned mechanisms in order that each mold may be brought to rest beneath such mechanisms successively, in the order named. In the normal operation of the machine the lever 236 is moved to a position to engage the clutch face of the collar 233 with the clutch element 235.

When a mold is brought to rest beneath the grout feeding mechanism, a charge of grout is supplied to the mold through the trough 43 in a manner heretofore described. At the same time the next adjacent mold in a forward direction is being supplied with a charge of aggregate from the aggregate feeding mechanism due to the continuous rotation of the drum 65 which causes one of the recesses 66 in the periphery thereof to transfer ingredients received from the hopper 57 to the spout 58 which empties into the discharge hopper 59 located directly over a mold.

The next adjacent mold in a forward direction is located beneath the rich mixture feeding mechanism and is being supplied with a charge therefrom by the reciprocation of the frame of the movable screen 82 with respect to the spaced, stationary screen 76. The frame 81 carrying the screen 82 is reciprocated once during each revolution of the cam element 240 which operates through the bell crank 243 to reciprocate the bar 113. Near the end of its stroke in a rearward direction, the bar 113 moves the screen 82 in a rearward direction due to the engagement of the projection 90 on the shaft 85 by the lug 246 carried by the bar 113. Near the end of the movement of the bar 113 in a forward direction, the lug 247 is brought into engagement with the projection 90 whereby the screen 82 is moved in a forward direction with respect to the screen 76. The screen 82 prevents any of the coarser particles from being passed to the screen 76 and further agitates the finer particles deposited on the screen 76 to force such particles through the latter.

Simultaneously with the operation of the shaft 85 by the bar 113, the latter reciprocates the measuring device within the lean mixture feeding mechanism which is disposed over the mold next adjacent the mold beneath the rich mixture feeding mechanism. As shown in Figure 22, the measuring device is midway between the extreme of its reciprocating stroke. When this measuring device is moved to its extreme position at the right of Figure 22, a full charge is measured, the volume of such charge being equal to the product of the area of the body 92 by the height of the web 111.

As the measuring device is moved from its extreme position on the right to its extreme position on the left, the measured charge is forced between the base plates 110 and 109 at the inner ends of the latter and is discharged into the mold.

The next adjacent mold in a forward direction is seated within the recess 120 in the base block 119, in which position such mold is located directly beneath the press block 126 operated by the piston 124. During each revolution of the cam element 211, the lever 255 is reciprocated due to the engagement of the roller 254 in the groove 210, such reciprocation of the lever 255 operating the valves within the valve chamber 128 to permit the passing of fluid therethrough to and from the cylinder 123 to provide for the reciprocation of the piston.

As the molds pass over the gear 14 at the rearward end of the machine, the molds are inverted, in which position they approach the mechanisms for opening and closing the mold sections, removing the tiles from the molds, and for cleaning and oiling the latter. The inverted mold first comes into contact with the actuating members 131 and 132 which engage the fingers 26 carried by the shafts 22 and 23 to provide for the rotation of the latter to separate the sections 17 of the mold. Immediately upon the separation of the mold sections 17, the spider arms 174 are lowered into position to lift the bottom 27 from the mold sections 17. The rack bar 156, to which the spider hub 155 is secured, moves through a complete cycle once during each revolution of the cam element 168 due to the roller 166, lever 164, rack arm 163, pinion 162, shaft 161, and gear 160 operatively connecting the cam element 168 with the bar 156. The cycle of the rack bar consists of a short downward movement, an upward movement throughout its entire path of travel, a downward movement almost throughout its entire path of travel and a short upward movement to the point of beginning.

At the beginning of the movement of the mold bottom lifting mechanism, the latter is positioned with the projections 177 on the fingers 175 in proximity to the stops 178 and with the noses 176 in slightly close proximity to the mold bottom. The mechanism moves downwardly at the beginning of its movement to bring the noses 176 into engagement with the recesses 29 in the mold bottoms 27, then moves upwardly to bring the pressed tile 197 into position with respect to the tile removing mechanism, then moves downwardly to return the mold bottom into position with respect to the mold sections, then moves upwardly to position the projections 177 of the fingers 175 slightly above the steps 178.

Upon the initial downward movement of the mechanism, the fingers 175 are swung outwardly on the pivots by the contact of the inclined lower faces of the noses 176 with the upper edges of the inverted mold bottom. This pivotal movement swings the projections 177 inwardly with respect to the stops 178 and permits the noses 176 to engage the recesses 29. Upon the upward movement of the mechanism, the projections 177 ride over the inclined faces 180 of the stops 178 and swing the latter about their pivots to permit the passing of the lifting mechanism. Upon the return downward movement of the mechanism, the projections 177 engage the stops 178 which swings the fingers 175 about their pivots to release the noses 176 from engagement with the mold bottom 27, whereupon the latter drops into position with respect to the mold sections 17. The empty mechanism then moves upwardly into its starting position.

The bottom 27 is maintained in proper position with respect to the separated sections 17 by means of the pins 28 projecting laterally from the edges of the bottom 27. The bottom 27 is thus supported by the pins 28 until the mold is brought into engagement with the actuating members 152 and 153 which engage the fingers 26 carried by the shafts 22 and 23, whereby the latter are rotated in a manner to close the mold sections 17 whereby the bottom 27 is gripped therebetween.

During the cycle of movement of the spider arms 174 to lift the bottom 27 from the sections 17 and to return the bottom thereto, the separated mold sections 17 are cleaned and oiled by the mechanism connected with the spider hub 155 by means of the yoke 170 in a manner hereinbefore described. During the period that the bottom 27 is in lifted position, the pressed tile 197 is removed therefrom, and the mold bottom is cleaned and oiled as heretofore described. The tile removing and bottom cleaning mechanism is operated by the reciprocation of the rack arm 205, owing to the teeth of the latter being in engagement with the gear 203 operatively connected with the lever 198, and the engagement of the roller 209 carried by the ear 207 engaging the groove 210 in the cam element 211. During the greater portion of the rotative movement of the cam element 211 the rack arm 205 remains stationary, being actuated only during the travel of the roller 209 over the portions 251, 253 and 252 of the groove 210.

The grout which is first fed into the mold constitutes the facing layer of the tile and is deposited in the mold in a liquid form. The grout is preferably formed by mixing one part of fine sand with three parts of cement, then adding thereto a coloring medium of any desired color equal to ten per-cent of the mixture of sand and cement, and then mixing in a sufficient quantity of water to render the entire mass substantially of the consistency of thin cream. The aggregates deposited on the grout within the mold readily bury themselves in the thin grout so as to be flush with the outer face of the tile when the latter is removed from the mold. The aggregates may consist of marble chips, granite chips, or any similar substance which it is found practical to use. If it is desired to produce a tile without having aggregates embedded therein, the aggregate feeding mechanism may be rendered inactive simply by removing the chain 238, or if desired the mechanism may be left active with the hopper 57 empty. The rich mixture constitutes the dry binding layer and is preferably formed in the proportions of one-half cement and one-half sand. The lean mixture is preferably formed in the proportions of three parts sand and one part hydraulic cement. The hydraulic press by means of which the contents of the molds are firmly pressed preferably will operate under a pressure of from five thousand to one hundred thousand pounds, depending upon the nature of the tile being produced and the size of the tile.

It is thought that the many advantages of a tile making machine in accordance with this invention will be readily apparent, and although the preferred embodiment of the invention is as illustrated and described, it is to be understood that changes in the size, shape and arrangement of parts may be resorted to, so long as such changes fall within the scope of the invention as defined in the appended claims. It is to be noted particularly that while the molds herein shown and described are of a shape to produce a square tile, the molds may be of proper shape to produce a tile of any configuration desired.

What I claim is:

1. A tile making machine comprising, an endless carrier arranged to provide an upper stretch and a lower stretch, a plurality of molds formed of separable side and bottom sections carried by the carrier, mechanisms for feeding tile ingredients into the molds of the upper stretch successively, mechanism for pressing the contents of the molds of the upper stretch successively, coordinated mechanisms for removing the pressed tiles from the molds of the lower stretch and for cleaning and oiling such molds successively, and driving means for simultaneously operating the several mechanisms, said coordinated mechanisms including means for spreading the side sections of the molds, means for lifting the bottom sections from the spread side sections, means for removing the tiles from the bottom sections and for cleaning the latter, and means for cleaning and oiling the spread side sections.

2. A tile making machine comprising, an endless carrier arranged to provide an upper stretch and a lower stretch, a plurality of molds formed of separable side and bottom sections carried by the carrier, mechanisms for feeding the tile ingredients into the molds of the upper stretch successively, mechanism for pressing the contents of the molds of the upper stretch successively, coordinated mechanisms for removing the pressed tiles from the molds of the lower stretch and for cleaning and oiling such molds successively, and driving means for simultaneously operating the several mechanisms, said coordinated mechanisms including means for spreading the side sections of the molds, means for lifting the bottom sections from the spread side sections and for simultaneously cleaning the latter, means for removing the tiles from the bottom sections and for simultaneously cleaning the latter, means for returning the bottom sections to the spread side sections and for simultaneously oiling the latter, and means for returning the spread side sections to their original relative positions.

3. A tile making machine comprising, an endless carrier arranged to provide an upper stretch and a lower stretch, a plurality of molds formed of separable side and bottom sections carried by the carrier, mechanisms for feeding tile ingredients into the molds of the upper stretch successively, mechanism for pressing the contents of the molds of the upper stretch successively, coordinated mechanisms for removing the pressed tiles from the molds of the lower stretch and for cleaning and oiling such molds successively, carrier actuating means for intermittently operating the carrier to position the molds with respect to the several mechanisms successively, mechanism actuating means for simultaneously operating the several mechanisms, and driving means for alternately operating said carrier actuating means and said mechanism actuating means, said coordinated mechanisms including means for spreading the side sections of the molds, means for lifting the bottom sections from the spread side sections, means for removing the tiles from the bottom sections and for cleaning the latter, and means for cleaning and oiling the spread side sections.

4. A tile making machine comprising, an endless carrier arranged to provide an upper stretch and a lower stretch, a plurality of molds formed of separable side and bottom sections carried by the carrier, mechanisms for feeding tile ingredients into the molds of the upper stretch successively, mechanism for pressing the contents of the molds of the upper stretch successively, coordinated mechanisms for removing the pressed tiles from the molds of the lower stretch and for cleaning and oiling said molds successively, carrier actuating means for intermittently operating the carrier to position the molds with respect to the several mechanisms successively, mechanism actuating means for simultaneously operating the several mechanisms, and driving means for alternately operating said carrier actuating means and said mechanism actuating means, said coordinated mechanisms including means for spreading the side sections of the molds, means for lifting the bottom sections from the spread side sections and for simultaneously cleaning the latter, means for removing the tiles from the bottom sections and for simultaneously cleaning the latter, means for returning the bottom sections to the spread side sections and for simultaneously oiling the latter, and means for returning the spread side sections to their original relative positions.

5. In a tile making machine, an endless carrier consisting of a pair of endless chains, each formed of pivotally connected links, a plurality of molds supported by and connecting said chains, each of said molds including a pair of relatively movable side sections having opposed lugs respectively formed with right and left hand internal threads, stub-shafts having external right and left hand threads for engagement with the threads of the opposed lugs, fingers secured to said shafts and extending transversely thereof, and actuating members for engagement with said fingers to provide for the rotation of the shafts to relatively move the mold sections.

6. In a tile making machine, an endless carrier consisting of a pair of endless chains, each formed of pivotally connected links, a plurality of molds supported by and connecting said chains, each of said molds including a pair of relatively movable side sections having opposed lugs respectively formed with right and left hand internal threads, stub-shafts having external right and left hand threads for engagement with the threads of the opposed lugs, fingers secured to said shafts and extending transversely thereof, and actuating members for engagement with said fingers to provide for the rotation of the shafts to relatively move the mold sections, each of said actuating members including an elongated hollow body, a yoke having its stem portion slidably extending into one end of said body, a roller rotatably mounted on the bifurcated end of the yoke, and a tension element within the body normally exerting an outward pressure on said yoke.

7. In a tile making machine, a mold formed of a bottom section and a pair of separable side sections, and mechanism for lifting the bottom section of an inverted mold from the side sections thereof and for simultaneously cleaning said side sections, said mechanism including a vertically movable rack bar, a spider carried by the rack bar, gripping fingers pivotally mounted on the spider for engagement with the bottom section of a mold to lift the latter upon the upward movement of the rack bar, a yoke having one end connected with said spider, a vertically movable rod connected with the opposite end of the yoke, and a brush carried by said rod for engagement with the side sections of the mold when the bottom section is lifted therefrom.

8. In a tile making machine, a mold formed of a bottom section and a pair of separable side sections, and mechanism for lifting the bottom section of an inverted mold from the side sections thereof and for simultaneously cleaning and oiling the side sections, said mechanism including a vertically movable rack bar, a spider carried by the rack bar, fingers pivotally connected with the spider for engagement with the bottom section of a mold to lift the latter upon the upward movement of the rack bar, a yoke having one end connected with the spider, a vertically slidable rod connected to the other end of the yoke, an oil pan mounted on the upper end of the rod, a brush carried by the oil pan and rod for engagement with the side sections of the mold when the rack bar is reciprocated, and a plurality of felt-lined bars engaging the side sections of the molds to oil the latter upon the downward movement of the rack bar.

9. In a tile machine, a mold formed of a pair of side sections and a bottom section removable therefrom, means for removing the bottom section of an inverted mold from the side sections thereof, and mechanism for removing a tile from the removed bottom section of a mold and for simultaneously cleaning the latter, said mechanism including an elongated element for engagement with a side edge of the tile to be removed, a plurality of spaced fingers projecting laterally from said elongated element adjacent the lower face of the latter, and a cylindrical brush carried by said elongated element, said brush being oppositely disposed with respect to said fingers.

10. A tile making machine comprising, a plurality of molds formed of separable side and bottom sections, means for feeding tile ingredients into the molds, means for pressing the ingredients within the molds, lifting means for removing the bottom sections and tiles from the side sections and for returning the bottom sections to the side sections, means for removing the tiles from the lifted bottom sections and for cleaning and oiling the latter, and means carried by said lifting means for cleaning and oiling the side sections.

11. A tile making machine comprising, a plurality of molds formed of separable side and bottom sections, means for feeding tile ingredients into the molds, means for pressing the ingredients within the molds, reciprocating means movable in one direction for removing the bottom sections and tiles from the side sections and for cleaning the side sections, said reciprocating means being movable in the opposite direction for oiling the side sections and returning the bottom sections, and means operating between said movements of the reciprocating means for removing the tiles from the bottom sections and for cleaning and oiling the latter.

12. A tile making machine comprising, a plurality of molds formed of separable side and bottom sections, means for feeding tile ingredients into the molds, means for pressing the ingredients within the molds, reciprocating means movable in one direction for removing the bottom sections and tiles from the side sections and movable in the opposite direction for returning the bottom sections, means operating between said movements of the reciprocating means for removing the tiles from the bottom sections, and means carried by the tile removing means for cleaning and oiling the bottom sections.

13. A tile making machine comprising, a plurality of molds formed of separable side and bottom sections, means for feeding tile ingredients into the molds, means for pressing the ingredients within the molds, reciprocating means movable in one direction for removing the bottom sections and tiles from the side sections and movable in the opposite direction for returning the bottom sections, means operating between said movements of the reciprocating means for removing the tiles from the bottom sections, and means carried by the tile removing means for supporting the removed tiles.

14. A tile making machine comprising, a plurality of molds formed of separable side and bottom sections, means for feeding tile ingredients into the molds, means for pressing the ingredients within the molds, reciprocating means movable in one direction for removing the bottom sections and tiles from the side sections and movable in the opposite direction for returning the bottom sections, means operating between said movement of the reciprocating means for removing the tiles from the bottom sections, and means carried by said reciprocating means for cleaning and oiling the side sections.

15. A tile making machine comprising, a plurality of molds formed of separable side and bottom sections, means for feeding tile ingredients into the molds, means for pressing the ingredients within the molds, means moving across the tile contacting faces of the side sections for removing the bottom sections and tiles from the side sections and for cleaning the latter, and means moving across the tile contacting faces of the removed bottom sections for removing the tiles from the bottom sections and for cleaning the latter.

In testimony whereof, I affix my signature hereto.

CHARLES E. STOCKDALE.